United States Patent
Kimura et al.

(10) Patent No.: US 7,821,904 B2
(45) Date of Patent: Oct. 26, 2010

(54) OPTICAL PICKUP APPARATUS AND OBJECTIVE OPTICAL ELEMENT

(75) Inventors: Tohru Kimura, Hachioji (JP); Yuichi Atarashi, Hachioji (JP); Kiyono Ikenaka, Hino (JP); Kenji Ogiwara, Hachioji (JP); Eiji Nomura, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 1369 days.

(21) Appl. No.: 11/222,137

(22) Filed: Sep. 9, 2005

(65) Prior Publication Data
US 2006/0077793 A1    Apr. 13, 2006

(30) Foreign Application Priority Data
Sep. 15, 2004 (JP) ............... 2004-268217
Oct. 8, 2004 (JP) ............... 2004-296782
Oct. 12, 2004 (JP) ............... 2004-297592

(51) Int. Cl.
*G11B 7/00* (2006.01)

(52) U.S. Cl. ............... 369/112.23; 369/44.23; 369/44.37

(58) Field of Classification Search ............... None
See application file for complete search history.

(56) References Cited

U.S. PATENT DOCUMENTS

2004/0047269 A1* 3/2004 Ikenaka et al. ......... 369/112.08
2004/0257958 A1* 12/2004 Kimura et al. ......... 369/112.23

FOREIGN PATENT DOCUMENTS

EP        1 304 689 A2    4/2003

* cited by examiner

*Primary Examiner*—Jorge L Ortiz Criado
(74) *Attorney, Agent, or Firm*—Finnegan, Henderson, Farabow, Garrett & Dunner, L.L.P.

(57) ABSTRACT

A light flux from the first light source forms a converged spot on first optical information recording medium by only a refraction action of the aspheric surface, or by a combination of the refraction action and an optical action given by at least one of the first phase structure and the second phase structure, a light flux from the second light source forms a converged spot on second optical recording medium by a combination of a refraction action of the aspheric surface and an optical action given by at least one of the first phase structure and the second phase structure, and a light flux from the third light source forms a converged spot on third optical recording medium by a combination of a refraction action of the aspheric surface and an optical action given by at least one of the first phase structure and the second phase structure.

18 Claims, 1 Drawing Sheet

OPTICAL PICKUP APPARATUS AND OBJECTIVE OPTICAL ELEMENT

This application is based on Japanese Patent Application No. 2004-268217 filed on Sep. 15, 2004, No. 2004-296782 filed on Oct. 8, 2004, and No. 2004-297592 filed on Oct. 12, 2004, in Japanese Patent Office, the entire content of which is hereby incorporated by reference.

BACKGROUND OF THE INVENTION

The present invention relates to an optical pickup apparatus by which the recording and/or reproducing of the information can be compatibly conducted on different kinds of optical information recording media, and to an objective optical element.

Recently, in the optical pickup apparatus, the wavelength-shortening of the laser light source used as the light source for the reproducing of the information recorded in the optical disk, or the recording of the information in the optical disk is advanced, for example, a laser light source of the wavelength 400-420 μm, such as the blue violet semiconductor laser, or the blue violet SHG laser to conduct the wavelength conversion of the infrared semiconductor laser by using the second harmonic wave, is putting to a practical use. In the case where these blue violet laser light sources are used, when the objective lens of the same numerical aperture (NA) as DVD (Digital Versatile Disc) is used, the recording of the information of 15-20 GB becomes possible for the optical disk of 12 cm diameter, and when NA of the objective lens is increased to 0.85, the recording of the information of 23-25 GB becomes possible for the optical disk of 12 cm diameter. In the present specification, the optical disk and photo-magnetic disk using the blue violet laser light source are generally called as "high-density optical disk", hereinafter.

Hereupon, in the high-density optical disk for which the objective lens of NA 0.85 is used, because the coma generated due to the skew of the optical disk is increased, there is the lens whose protective layer is designed thinner than the case in DVD (0.1 mm to 0.6 mm of DVD), and in which the coma due to the skew is reduced. Hereupon, not only saying that the recording and reproducing of the information can be adequately conducted on such type of the high-density optical disk, it can not be said that a value as a product of the optical disk player/recorder is enough. In the present time, based on a actuality that DVD Or CD (Compact Disk) in which various information are recorded, is put in a market, it is not enough only that the recording/reproducing of the information can be conducted on the high-density optical disk, but, a fact that, for example, also for DVD or CD which is owned by the user, the recording/reproducing of the information can be adequately conducted in the same manner, can introduce to an actuality that a value of the product as the optical disk player/recorder for the high-density optical disk is enhanced. From such a background, it is requested that, while the optical pickup apparatus mounted in the optical disk player/recorder for the high-density optical disk keeps the compatibility also for any one of the high-density optical disk and DVD, further, CD, the apparatus has the performance which can adequately record/reproduce the information.

As a method by which, while the apparatus has the compatibility also for any one of the high-density optical disk and DVD, further, CD, the information can be adequately recorded/reproduced, a method by which the optical system for the high-density optical disk and the optical system for DVD or CD are selectively switched corresponding to the recording density of the optical disk for which the information is recorded/reproduced, is considered, however, because a plurality of optical systems are necessary, it is disadvantageous for the size reduction, and further, the cost is increased.

Accordingly, in order to simplify the structure of the optical pickup apparatus and to intend the cost reduction, also in the optical pickup apparatus having the compatibility, it is preferable that the optical system for the high-density optical disk and the optical system for DVD or CD are made in common and the number of optical parts constituting the optical pickup apparatus is reduced at most. Then, it is most advantageous for the simplification of the structure of the optical pickup apparatus, and for the cost reduction that the objective optical system arranged in opposite to the optical disk is made in common. Hereupon, in order to obtain the objective optical system common for a plurality of kinds of optical disks whose recording/reproducing wavelengths are different from each other, it is necessary that the phase structure having the wavelength dependency of the spherical aberration is formed in the objective optical system.

In the Patent Document 1, an objective optical system which has the diffractive structure as the phase structure, and can be commonly used for the high-density optical disk and the conventional DVD and CD, and an optical pickup apparatus in which this objective optical system is mounted are written.

[Patent Document 1] Europe Unexamined Patent No. 1304689

However, because the objective optical element used for the optical pickup apparatus by which the recording and/or reproducing of the information is compatibly conducted on 3 different optical disks written in the above Patent Document 1 is the structure in which the objective lens and the optical element in which the phase structure is formed are combined in the optical axis direction, it is comparatively large sized and weighted, and the burden of an actuator for driving it at the time of the tracking or focusing, is large, accordingly, there is a problem that it is necessary that a large sized actuator is used, and the size reduction or energy saving of the optical pickup apparatus is not intended.

SUMMARY OF THE INVENTION

The present invention is attained by considering the above problems and the object of the present invention is to provide an optical pickup apparatus which has the phase structure, and in which the objective optical system by which the recording and/or reproducing the information can be adequately conducted on 3 kinds of disks whose recording density is different, which includes the high-density optical disk using the blue violet laser light source, DVD and CD, is mounted, and by which the simplification of the structure and the cost reduction can be realized, and an objective optical element.

In the present specification, optical disks (called also optical information recording media) using the blue violet semiconductor laser or the blue violet SHG laser as the light source for recording/reproducing of the information are generally called as "high-density optical disk", and other than an optical disk in which the recording/reproducing of the information is conducted by the objective optical system of NA 0.85 and the optical disk of the standard whose protective layer thickness is about 0.1 mm (for example, BD: Blue Ray Disk), an optical disk in which the recording/reproducing of the information is conducted by the objective optical system of NA 0.65 to 0.67 and the optical disk of the standard whose protective layer thickness is about 0.6 mm (for example, HD DVD: also simply called HD) is included. Further, it is assumed that, other than the optical disk having such a protective layer on its information recording surface, an optical disk having a protective film of the thickness of about several to several tens nm on the information recording surface, or an optical disk whose protective layer thickness or protective film thickness is 0, is also included. Further, in the present specification, it is assumed that, in the high-density optical disk, a photo-magnetic disk using, as the light source for recording/reproducing of the information, the blue violet semiconductor laser or the blue violet SHG laser is also included.

Furthermore, in the present specification, DVD is a general name of DVD series optical disks such as DVD-ROM, DVD-Video, DVD-Audio, DVD-RAM, DVD-R, DVD-RW, DVD+R, DVD+RW, and CD is a general name of CD series optical disks such as CD-ROM, CD-Audio, CD-Video, CD-R, CD-RW. The recording density is highest in the high-density optical disk, next, it is lowered in order of DVD, CD.

An optical pickup apparatus written in item 1 is characterized in that: in an optical pickup apparatus which has the first light source emitting the first light flux of the wavelength $\lambda 1$, the second light source emitting the second light flux of the wavelength $\lambda 2$ ($\lambda 2 > \lambda 1$), the third light source emitting the third light flux of the wavelength $\lambda 3$ ($\lambda 3 > \lambda 2$), and a converging optical system for converging the first light flux on the information recording surface of the first optical information recording medium whose protective substrate thickness is t1, for converging the second light flux on the information recording surface of the second optical information recording medium whose protective substrate thickness is t2 (t1$\leq$t2), and for converging the third light flux on the information recording surface of the third optical information recording medium whose protective substrate thickness is t3 (t2<t3), and in which, when the light flux from the light source is condensed on the information recording surface of the optical information recording medium through the converging optical system, the recording and/or reproducing of the information is conducted, the converging optical system is an objective optical system commonly used for the first to the third optical information recording media, and has a single lens objective optical element which has the first phase structure on the light source side, the second phase structure on the optical information recording medium side, and in which at least one surface is aspheric surface; a coupling lens independently or commonly used for each of the first to the third light sources for the purpose that the emitting light flux at least from the first light source enters into the objective optical element in the infinite parallel light flux, and the emitting light flux from the second and third light sources enters into the objective optical element in the infinite parallel light flux or a weak finite divergent light flux; and a temperature correcting element which is arranged in the optical path in which the light flux emitted at least from the first light source passes the element and arrives at the objective optical element; and the light flux emitted from the first light source forms a converging spot on the information recording surface of the first optical information recording medium by only the refraction action in which the aspheric surface has, or by a combination of the concerned refraction action and the optical action given by at least one of the first phase structure and the second phase structure, the light flux emitted from the second light source forms a converging spot on the information recording surface of the second optical information recording medium by a combination of the refraction action which the aspheric surface has, and the optical action given by at least one of the first phase structure and the second phase structure, and the light flux emitted from the third light source forms a converging spot on the information recording surface of the third optical information recording medium by a combination of the refraction action which the aspheric surface has, and the optical action given by at least one of the first phase structure and the second phase structure.

Herein, for the purpose that the recording/reproducing of the information can be conducted on BD, DVD and CD, it is necessary that the spherical aberration due to the difference between the thickness of protective layers of BD and DVD and the spherical aberration due to the difference between the thickness of protective layers of BD and CD are corrected.

On the one hand, for the purpose that the recording/reproducing of the information can be conducted on HD DVD and DVD and CD, it is necessary that the spherical aberration due to the difference between the using wavelengths of HD DVD and DVD, and the spherical aberration due to the difference between the thickness of protective layers of HD DVD and CD are corrected.

In this manner, also when any one of BD and HD DVD is used, in order to realize the lower grade compatibility of DVD and CD, because it is necessary to correct 2 kinds of spherical aberrations, at least 2 phase structures are provided in the objective optical element.

Further, in order to stably conduct the recording/reproducing on the optical disk using the blue violet laser light sources it is necessary to adequately correct the spherical aberration of the converging optical system. That is, in order to compatibly conduct the recording/reproducing of the information on the high-density optical disk, DVD and CD by using the common objective optical system, it is desirable that the correction of above 2 kinds of spherical aberrations and the correction of the spherical aberration based on the refractive index change due to the temperature change (called temperature characteristic) when the light flux of wavelength $\lambda 1$ is used, are compatible.

Hereupon, to make the objective optical element have the correction function of the spherical aberration by the temperature characteristic, it is not realistic from the following 2 reasons. (1) In the case where 2 phase structures to correct the above 2 kinds of spherical aberrations are formed in the objective optical element, when the phase structure to correct the temperature characteristic is further provided in addition to them, because the number of phase structures through which laser light fluxes of respective wavelengths pass becomes many, the lowering of the transmissivity by the shape error causes a large problem. (2) Although the function to correct the temperature characteristic of the blue violet range can be made to have in the phase structure to correct the spherical aberration between the optical information recording media, in such a case, because the shape of the phase structure becomes minute, the influence of the diffraction efficiency lowering by the shape error of the diffraction pattern is more increased. On the one hand, even when the design work is conducted so that the shape of the phase structure does not become minute, because the spherical aberration correction function between the optical information recording media, or the spherical aberration correction function of the blue violet region is insufficient, there is a possibility that the coexistence of the compatibility between the optical information recording media, and the correction of the temperature characteristic can not be attained.

Accordingly, in the present invention, it is made so that, when the temperature correcting element is arranged in the optical path in which the light flux emitted from at least the first light source passes through and arrives at the objective optical element, even when the objective optical element of a single lens is used, the coexistence of the compatibility among the optical information recording media and the correction of the temperature characteristic is intended, and the recording and/or reproducing of the information can be adequately conducted on 3 kinds of different optical information recording media.

Incidentally, "a weak finite divergent light flux" means that when an optical system magnification is m, the optical system magnification m satisfies the following formula:

$$-1/100 < m < 0.$$

Further, "a phase structure" means a structure to provide a phase difference between ring-shaped zones, and "to form a converged spot" means that a light flux converges to almost one point in the sense of geometrical optics on a condition that a wavefront aberration is less Marechal's criterion.

DETAILED DESCRIPTION OF THE PREFERRED EMBODIMENT

Figure 1:
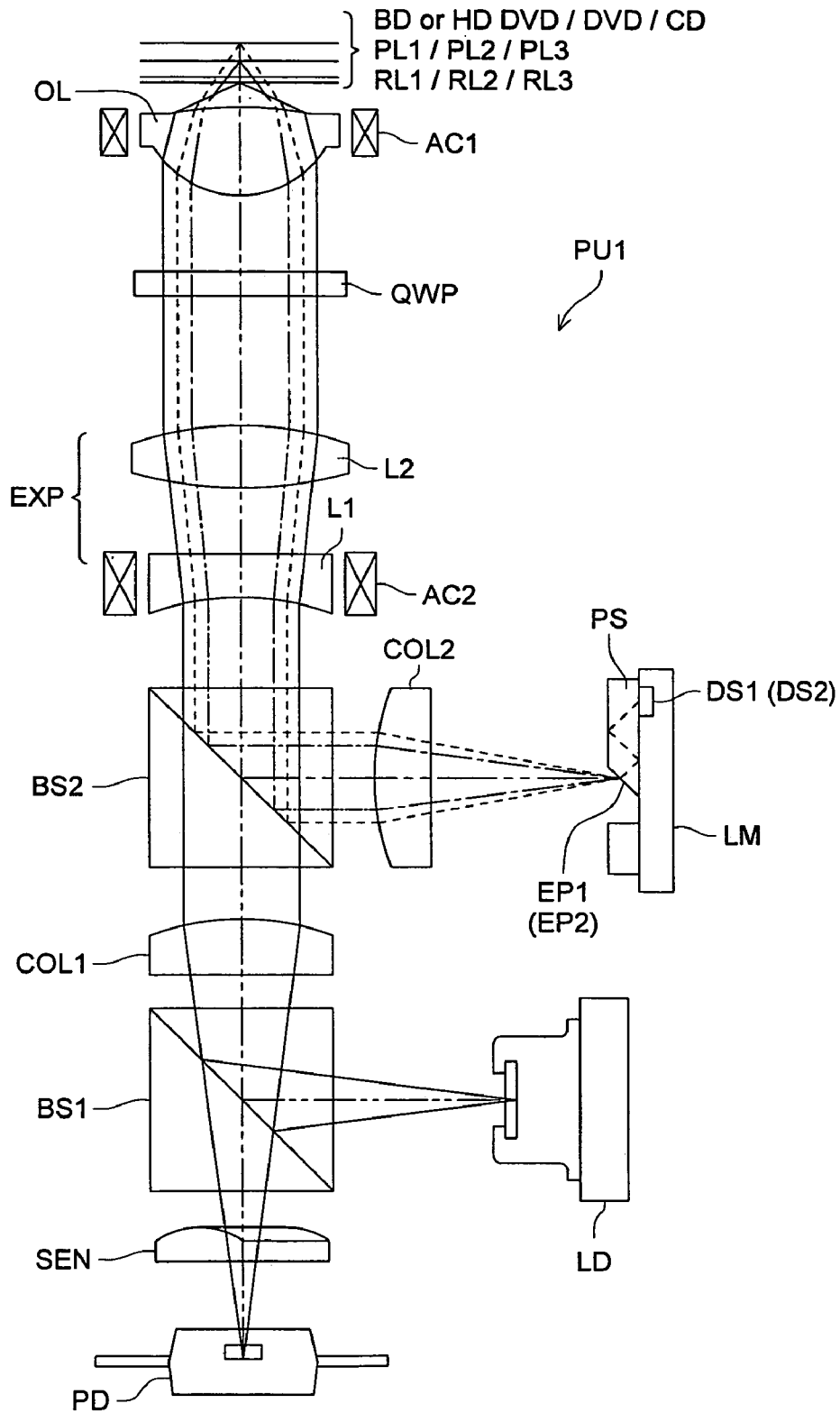
FIG. 1 is a view schematically showing the structure of the optical pickup apparatus PU1.

The optical pickup apparatus written in item 2 is characterized in that: in the first invention, when the temperature correcting element moves at least one optical element in the optical axis direction, the spherical aberration generated due to the temperature change is corrected.

The optical pickup apparatus written in item 3 is characterized in that: in the first invention, the temperature correcting element has an optical function surface to correct the spherical aberration generated due to the temperature change. As the optical function surface, there is an optical surface in which, for example, the phase structure is provided. Here, "optically function surface" means a surface on which a light flux is refracted or diffracted so as to contribute to form a light spot.

The optical pickup apparatus written in item 4 is characterized in that: in the first invention, the temperature correcting element includes a coupling lens through which only the light flux from the first light source passes.

The optical pickup apparatus written in item 5 is characterized in that: in any one of the inventions of items 1-2, the temperature correcting element includes a coupling lens through which at least 2 of the light fluxes from the first light source to the third light source pass.

The optical pickup apparatus written in item 6 is characterized in that: in any one of the inventions of items 1-3, the temperature correcting element includes a beam expander optical system.

The optical pickup apparatus written in item 7 is characterized in that: in the optical pickup apparatus which has: the first light source emitting the first light flux of the wavelength $\lambda 1$; the second light source emitting the second light flux of the wavelength $\lambda 2$ ($\lambda 2 > \lambda 1$); the third light source emitting the third light flux of the wavelength $\lambda 3$ ($\lambda 3 > \lambda 2$); and a converging optical system by which the first light flux is condensed on the information recording surface of the first optical information recording medium whose protective substrate thickness is t1; the second light flux is condensed on the information recording surface of the second optical information recording medium whose protective substrate thickness is t2 (t1 $\leq$ t2); the third light flux is condensed on the information recording surface of the third optical information recording medium whose protective substrate thickness is t3 (t2 < t3); and in which the recording and/or reproducing of the information is conducted by converging the light fluxes from the light sources on the information recording surfaces of the optical information recording media through the converging optical system, a converging optical system is an objective optical element commonly used for the first to the third optical information recording medium, and has a single lens objective optical element which has the first phase structure on the light source side, the second phase structure on the optical information recording medium side, and in which at least one surface is aspheric surface; a coupling lens independently or commonly used for each of the first to the third light source for the purpose that the emitting light flux at least from the first light source enters into the objective optical element in the infinite parallel light flux, the emitting light flux from the second and third light sources enters into the objective optical element in the infinite parallel light flux or weak finite divergent light flux; and a paraxial chromatic aberration correcting element which is arranged in the optical path in which the light flux emitted at least from the first light source passes the element and arrives at the objective optical element; and the light flux emitted from the first light source forms a converging spot on the information recording surface of the first optical information recording medium by only the refraction action which the aspheric surface has, or by a combination of the concerned refraction action and the optical action given by at least one of the first phase structure and the second phase structure, the light flux emitted from the second light source forms a converging spot on the information recording surface of the second optical information recording medium by a combination of the refraction action which the aspheric surface has, and the optical action given by at least one of the first phase structure and the second phase structure, and the light flux emitted from the third light source forms a converging spot on the information recording surface of the third optical information recording medium by a combination of the refraction action which the aspheric surface has, and the optical action given by at least one of the first phase structure and the second phase structure.

As described above, in the objective optical system commonly used for conducting the recording and/or reproducing of the information on the first to third optical information recording media, it is necessary that 2 kinds of spherical aberrations are corrected, however, in order to give a good compatibility to the objective optical element, it is desirable that at least 2 phase structures are formed in the objective optical element.

On the one hand, in order to stably conduct the recording/reproducing on the optical disk using the blue violet laser light source, it is necessary that the chromatic aberration of the converging optical system is adequately corrected. That is, in order to compatibly conduct the recording/reproducing on the high-density optical disk, DVD and CD by using the common objective optical element, it is desirable that the correction of 2 kinds of spherical aberrations and the correction of chromatic aberration of the blue violet range stand together.

However, to give the chromatic aberration correction function further to the objective optical element, is not realistic from the following 2 reasons. (1) In the case where 2 phase structures for correcting above 2 kinds of spherical aberrations are formed in the objective optical element, when, in addition to them, the phase structure for correcting the chromatic aberration is further provided, because the number of phase structures through which the laser light fluxes of respective wavelengths pass is increased, the transmissivity lowering by the shape error causes a large problem. (2) It is possible that the function to correct the chromatic aberration of the blue violet range is given to the phase structure for correcting the spherical aberration among optical information recording media, however, in such a case, because the shape of the phase structure becomes minute, the influence of the lowering of the diffraction efficiency by the shape error of the diffraction pattern is more increased. On the one hand, even when the design work is conducted so that the shape of the phase structure does not become minute, because the spherical aberration correction function among optical information recording media, or the chromatic aberration correction function of the blue violet range becomes insufficient, there is a possibility that the coexistence of the compatibility among the optical information recording media and the correction of the chromatic aberration can not be attained.

Accordingly, in the present invention, the system is structured in such a manner that, when a paraxial chromatic aberration correcting element is arranged in the optical path in which the light flux emitted from at least the first light source passes and arrives at the objective optical element, even when a single lens of objective optical element is used, the coexistence of the compatibility among the optical information recording media and the correction of the chromatic aberration of the blue violet range is intended, and the recording and/or reproducing of the information can be adequately conducted on 3 kinds of different optical information recording media.

Incidentally, "chromatic aberration" means a positional deviation of a converged light spot in the optical axis direction before and after a wavelength change, here, the converged light spot is formed at a position where a wavefront aberration becomes minimum. As a cause by which a wavelength is changed, an Individual difference of each laser, a mode hop, a laser oscillation at the time of a temperature fluctuation may be presumed. Here, since a cause to raise a problem of chromatic aberration is a momentary wavelength change for which an action of an actuator can not follow for the positional deviation in the optical axis, the mode hop is made as a main target to be corrected.

The optical pickup apparatus written in item 8 is characterized in that: in the invention written in item 7, the chromatic aberration correcting element corrects the chromatic aberration when at least one optical element is moved in the optical axis direction.

The optical pickup apparatus written in item 9 is characterized in that: in the invention written in item 7, the chromatic aberration correcting element has an optical function surface for correcting the chromatic aberration.

The optical pickup apparatus written in item 10 is characterized in that: in any one of the inventions in items 7-9, the chromatic aberration correcting element includes a coupling lens through which only the light flux from the first light source passes.

The optical pickup apparatus written in item 11 is characterized in that: in any one of the inventions in items 7-9, the chromatic aberration correcting element includes a coupling lens through which at least any 2 of light fluxes from the first light source to the third light source pass.

The optical pickup apparatus written in item 12 is characterized in that: in any one of the inventions in items 7-9, the chromatic aberration correcting element includes a beam expander optical system.

The optical pickup apparatus written in item 13 is characterized in that: in any one of inventions of items 1-12, the first phase structure is a superimposed type diffractive structure in which patterns whose sectional shape including the optical axis is a stair-shape, are concentric circularly arranged and for each number of a predetermined level surfaces, steps are shifted by the height for the number of the steps corresponding to the number of level surfaces, and an optical path added to a light flux of wavelength $\lambda 1$ by a step difference in each pattern of the first phase structure is integer times of $\lambda 1$.

"The superimposed type diffractive structure" means a structure in which plural diffracting functions are provided on the same surface. For example, an example takes for a structure in which at least one optical function surface is divided into a plurality of optical function areas around the optical axis, and at least one of the plurality of optical function areas is divided into ring-shaped areas around the optical axis, and a predetermined number of discontinuous steps are provided in each ring-shaped zone, and the ring-shaped zones in which discontinuous steps are provided are continuously arranged. The superimposed type diffractive structure is called also the multi-level structure, DOE structure, for example, the diffractive structure is a structure in which the optical function surface of the optical element is divided into a plurality of ring-shaped zones around the optical axis, and this ring-shaped zones are respectively formed in the saw-toothed manner, and in one saw-toothed part, a predetermined number of step shapes are further provided. Hereby, the diffraction action having the wavelength selectivity can be given to the optical element. Hereupon, the number of steps or the height, or width of the step of the step shape, can be appropriately designed. Specifically, it is written in Tokkaihei No. 9-306018. Incidentally, "saw-tooth-shaped diffractive structure is an example of the diffractive structure capable of diffracting a light flux with a high efficiency.

The optical pickup element written in item 14 is characterized in that: in any one of the inventions of items 1-12, the first phase structure is a saw-tooth shaped diffractive structure. The "saw-tooth shaped diffractive structure" means a structure in which, for example, at least one optical function surface is divided into a plurality of optical function areas around the optical axis, and at least one of the plurality of optical function areas is divided into ring-shaped areas around the optical axis, and a predetermined number of discontinuous steps are provided in each ring-shaped zone and the cross section in the optical axis direction is saw-toothed.

The optical pickup apparatus written in item 15 is characterized in that: in any one of the inventions of items 1-12, the first phase structure is an optical path difference providing structure.

"Optical path difference providing structure" is a structure constructed by plural ring-shaped zones divided with a fine step difference on a central region including the optical axis and the outside of the central region. The optical path difference providing structure has the following characteristics: At a predetermined temperature, the optical path difference providing structure generates an optical path difference corresponding to integral multiples of a wavelength of an incident light flux between wavefronts passing through neighboring ring-shaped zones, and when a temperature is changed from the predetermined temperature, a optical path difference generated between wavefronts passing through neighboring ring-shaped zones deviates from that corresponding to integral multiples of a wavelength of an incident light flux. The optical path difference providing structure is called also NPS (Non Periodic Surface) structure, phase structure.

The optical pickup apparatus written in item 16 is characterized in that: in any one of inventions of items 1-15, the second phase structure is a superimposed type diffractive structure in which patterns whose sectional shape including the optical axis is a stair-shape, are concentric circularly arranged and for each number of a predetermined level surfaces, steps are shifted by the height for number of steps corresponding to the number of level surfaces, and the optical path added to the light flux of wavelength λ1 by the step difference in each pattern of the second phase structure is integer times of λ1.

The optical pickup apparatus written in item 17 is characterized in that: in any one of inventions of items 1-15, the second phase structure is a saw-toothed diffractive structure.

The optical pickup apparatus written in item 18 is characterized in that: in any one of inventions of items 1-15, the second phase structure is an optical path difference providing structure.

The optical pickup apparatus written in item 19 is characterized in that: in any one of inventions of items 1-18, the first phase structure does not exert a diffraction effect on an incident light flux of wavelength λ1 and an incident light flux of wavelength λ3, but exerts a diffraction effect on an incident light flux of wavelength λ2, and corrects a spherical aberration due to the thickness t1 of the protective substrate of the first optical information recording medium and the thickness t2 of the protective substrate of the second optical information recording medium, or a spherical aberration due to a wavelength difference between the wavelength λ1 of a light flux from the first light source and the wavelength λ2 of a light flux from the second light source, and the second phase structure does not exert a diffraction effect on an incident light flux of wavelength λ1 and an incident light flux of wavelength λ2, but exerts a diffraction effect on an incident light flux of wavelength λ3, and correct a spherical aberrations due to the thickness t1 of the protective substrate of the first optical information recording medium and the thickness t3 of the protective substrate of the third optical information recording medium.

The optical pickup apparatus written in item 20 is characterized in that: in the invention of item 19, when the first phase structure and the second phase structure are superimposed type diffractive structure, the optical path difference added to the light flux of the wavelength λ1 by the step difference in the patterns of the superimposed type diffractive structure, is integer times of the wavelength λ1.

The optical pickup apparatus written in item 21 is characterized in that: in the invention of item 20, the level surface formed in each pattern of the first phase structure and the second phase structure is formed along the base aspheric surface.

The optical pickup apparatus written in item 22 is characterized in that: in the invention of item 21, the base aspheric surface of the first phase structure and the second phase structure is formed so that, when the recording and/or reproducing of the information is conducted on the information recording surface of the first optical information recording medium through the protective substrate of thickness t1 by using the light flux of the wavelength λ1, the spherical aberration is optimum.

The optical pickup apparatus written in item 23 is characterized in that: in any one of the inventions of items 20-22, in the objective optical element, the objective lens is formed of the material whose Abbe's number vd is in the range of 40-80, and the number of level surfaces in each pattern of the first phase structure is 5, and the number of level surfaces in each pattern of the second phase structure is 2.

The optical pickup apparatus written in item 24 is characterized in that: in any one of the inventions of items 20-22, the objective optical element is formed of the material whose Abbe's number vd is in the range of 20-40, and the number of level surfaces in each pattern of the first phase structure is 5, and the number of level surfaces in each pattern of the second phase structure is 3 or 4.

The optical pickup apparatus written in item 25 is characterized in that: in any one of the inventions of items 20-22, the objective optical element has the structure in which the first material whose Abbe's number vd is in the range of 40-80, and the second material whose Abbe's number vd is in the range of 20-40, are combined in the optical axis direction, and the first phase structure is formed on the surface of the first material, and the number of level surfaces in each pattern of the first phase structure is 5, and the second phase structure is formed on the surface of the second material, and the number of level surfaces in each pattern of the second phase structure is 3 or 4.

The optical pickup apparatus written in item 26 is characterized in that: in any one of the inventions of items 20-22, the objective optical element has the structure in which the first material whose Abbe's number vd is in the range of 40-80, and the second material whose Abbe's number vd is in the range of 20-40, are combined in the optical axis direction, and the first phase structure is formed on the surface of the first material, and the number of level surfaces in each pattern of the first phase structure is 5, and the second phase structure is formed on the interface of the first material and the second material, and the number of level surfaces in each pattern of the second phase structure is any one of 3, 4, 5.

The optical pickup apparatus written in item 27 is characterized in that: in any one of the inventions of items 19-26, the optical surface in which the first phase structure and the second phase structure are formed, is divided into the central area including the optical axis and a peripheral area surrounding the central area, and the first phase structure and the second phase structure are respectively formed in the central area.

The optical pickup apparatus written in item 28 is characterized in that: in any one of the inventions of items 1-18, the first phase structure generates the diffraction light of the even number order when the light flux of the wavelength λ1 is incident, and the spherical aberration due to the thickness t1 of the protective substrate of the first optical information recording medium and the thickness t2 of the protective substrate of the second optical information recording medium, or the spherical aberration due to the wavelength difference between the wavelength λ1 of the light flux from the first light source and the wavelength λ2 of the light flux from the second light source is corrected, and the second phase structure does not exert the diffraction effect on the incident light flux of the wavelength λ1 and the light flux of the wavelength λ2, but exerts the diffraction effect on the incident light flux of the wavelength λ3, and the spherical-aberration due to the thickness t1 of the protective substrate of the first optical information recording medium and the thickness t3 of the protective substrate of the third optical information recording medium is corrected.

The optical pickup apparatus written in item 29 is characterized in that: in the inventions of item 28, the first phase structure, when the light flux of wavelength λ1 is incident, generates the diffraction light of any order of 8-order, 6-order, second-order.

The optical pick-apparatus written in item 30 is characterized in that: in the invention of item 29, when the second phase structure is a superimposed type diffractive structure, the optical path difference added to the light flux of wavelength λ1 by the step difference in patterns of the superimposed type diffractive structure, is integer times of the wavelength λ1.

The optical pickup apparatus written in item 31 is characterized in that: in the invention of item 30, the level surfaces formed in each pattern of the second phase structure are formed along the base aspheric surface.

The optical pickup apparatus written in item 32 is characterized in that: in the invention of item 30 or 31, in the objective optical element, the objective lens is formed of the material whose Abbe's number νd is in the range of 40-80, and the number of level surfaces in each pattern of the second phase structure is 2.

The optical pickup apparatus written in item 33 is characterized in that: in the invention of item 30 or 31, in the objective optical element, the objective lens is formed of the material whose Abbe's number νd is in the range of 20-40, and the number of level surfaces in each pattern of the second phase structure is 3 or 4.

The optical pickup apparatus written in item 34 is characterized in that: in the invention of item 30 or 31, the objective optical element has the structure in which the first material whose Abbe's number νd is in the range of 40-80, and the second material whose Abbe's number νd is in the range of 20-40, are combined in the optical axis direction, and the first phase structure is formed on the surface of the first material, the second phase structure is formed on the surface of the second material, and the number of level surfaces in each pattern of the second phase structure is 3 or 4.

The optical pickup apparatus written in item 35 is characterized in that: in the invention of item 30 or 31, the objective optical element has the structure in which the first material whose Abbe's number νd is in the range of 40-80, and the second material whose Abbe's number νd is in the range of 20-40, are combined in the optical axis direction, and the first phase structure is formed on the surface of the first material, the second phase structure is formed on the interface between the first material and the second material, and the number of level surfaces in each pattern of the second phase structure is any one of 3, 4, 5.

The optical pickup apparatus written in item 36 is characterized in that: in any one of the inventions of items 20-35, the optical surface in which the second phase structure is formed, is divided into the central area including the optical axis and a peripheral area surrounding the central area, and the second phase structure is formed in the central area.

The optical pickup apparatus written in item 37 is characterized in that: in any one of the inventions of items 1-18, the first phase structure generates the diffraction light of the even number order when the light flux of the wavelength λ1 is incident, and the spherical aberration due to the thickness t1 of the protective substrate of the first optical information recording medium and the thickness t2 of the protective substrate of the second optical information recording medium, or the spherical aberration due to the wavelength difference between the wavelength λ1 of the light flux from the first light source and the wavelength λ2 of the light flux from the second light source is corrected, and the second phase structure generates the diffraction light of the odd number order when the light flux of the wavelength λ1 is incident, and the spherical aberration due to the thickness t1 of the protective substrate of the first optical information recording medium and the thickness t3 of the protective substrate of the third optical information recording medium is corrected.

The optical pickup apparatus written in item 38 is characterized in that: in the invention of item 37, the first phase structure generates the diffraction light of any one of 8th order, 6th order, 2nd order, when the light flux of the wavelength λ1 is incident, and the second phase structure generates the diffraction light of any one of 9th order, 7th order, 5th order, 3rd order, when the light flux of the wavelength λ1 is incident.

The optical pickup apparatus written in item 39 is characterized in that: in the invention of item 37 or 38, in the objective optical element, the objective lens is formed of the material whose Abbe's number νd is in the range of 20-40.

The optical pickup apparatus written in item 40 is characterized in that: in the invention of item 37 or 38, the objective optical element has the structure in which the first material whose Abbe's number νd is in the range of 40-80, and the second material whose Abbe's number νd is in the range of 20-40, are combined in the optical axis direction, and the first phase structure is formed on the surface of the first material, and the second phase structure is formed on the surface of the second material.

The optical pickup apparatus written in item 41 is characterized in that: in any one of the inventions of items 1-18, the light flux emitted from the first light source forms a converging spot on the information recording surface of the first optical information recording medium by only the refractive action of the aspheric surface, the light flux emitted from the second light source forms a converging spot on the information recording surface of the second optical information recording medium by the refractive action of the aspheric surface and the action by the first phase structure, and the light flux emitted from the third light source forms a converging spot on the information recording surface of the third optical information recording medium by the refractive action of the aspheric surface and the action by the second phase structure.

The optical pickup apparatus written in item 42 is characterized in that: in any one of the inventions of items 1-18, the first phase structure generates to the light flux of the wavelength λ1 the diffraction light of n1 order, to the light flux of the wavelength λ2 the diffraction light of n2 order, and to the light flux of the wavelength λ3 the diffraction light of n3 order, the second phase structure generates to the light flux of the wavelength λ1 the diffraction light of m1 order, to the light flux of the wavelength λ2 the diffraction light of m2 order, and to the light flux of the wavelength λ3 the diffraction light of m3 order. Where, n1-n3, m1-m3 are natural number, and n1≠n2, n1≠n3, m1≠m2, m1≠m3.

The optical pickup apparatus written in item 43 is characterized in that: in any one of the inventions of items 1-42, the wavelength λ1 is 380 nm<λ1<420 nm, the wavelength λ2 is 630 nm<λ2<680 nm, and the wavelength λ3 is 760 nm<λ3<830 nm.

The optical pickup apparatus written in item 44 is characterized in that: in any one of the inventions of items 1-43, the thickness t1 of the protective substrate of the first optical information recording medium is 0.1 mm or 0.6 mm.

The optical pickup apparatus written in item 45 is characterized in that: in any one of the inventions of items 1-44, when the recording and/or reproducing of the information is conducted on the information recording surface of the second optical information recording medium by dung the light flux of the wavelength λ2, the temperature correcting element for correcting the spherical aberration based on the refractive index change due to the temperature change of the objective optical element is provided.

The optical pickup apparatus written in item 46 is characterized in that: in any one of the inventions of items 1-45, the objective optical element is made of a low melting point glass.

The optical pickup apparatus written in item 47 is characterized in that: in any one of the inventions of items 1-45, the objective optical element is made of resin.

The optical pickup apparatus written in item 48 is characterized in that: in any one of the inventions of items 1-45, the objective optical element is composed by adhering the resin layer to the surface of the glass-made lens, and on the surface of the resin layer, the first phase structure and the second phase structure are formed.

The optical pickup apparatus written in item 49 is characterized in that: in the inventions of item 47 or 48, for the resin, particles whose diameter is less than 30 nm are dispersed.

The optical pickup apparatus written in item 50 is characterized in that: in the invention of item 49, the objective optical element satisfies the following condition.

$A < 8 \times 10^{-5}$. Where, A is a value expressed by the following equation.

$$A = \frac{(n^2+2)(n^2-1)}{6n}\left\{(-3\alpha) + \frac{1}{[R]}\frac{\partial [R]}{\partial t}\right\} \quad \text{(Math-2)}$$

α: linear expansion coefficient
[R]: molecular refraction

The temperature change of the refractive index will be described below. The temperature change of the refractive index is expressed by the above equation 2 when differentiating the refractive index n by the temperature t, based on the equation of Lorentz•Lorentz.

In the case of resin row material, generally, the contribution of the second term is smaller than that of the first term, and almost negligible. For example, in the case of PMMA resin, the linear expansion coefficient α is $7 \times 10^{-5}$, when it is substituted into the above equation, A is $-1.2 \times 10^{-4}$, and is almost equal to the observation value.

Herein, in the present invention, when minute particles, preferably inorganic minute particles are dispersed in the resin, practically, the contribution of the second term of the above equation is made large, and it is made to be cancelled out with the change by the linear expansion coefficient of the first term.

Specifically, it is preferable that the change which is conventionally about $-1.2 \times 10^{-4}$ is suppressed to not larger than $10 \times 10^{-5}$ in the absolute value. Then, preferably, to suppress to not larger than 8×10-5, more preferably to not larger than $6 \times 10^{-5}$, is preferable for the optical design, or the optical element.

Further, the contribution of the second term is made larger, and it is also possible to provide the temperature characteristic reverse to the original one of the resin material. That is, a raw material in which, when the temperature rises, the refractive index is not lowered, but inversely, the refractive index is increased, can also be obtained.

The optical pickup apparatus written in item 51 is characterized in that: in the invention of item 50, the objective optical element satisfies the following condition.

$|A| < 6 \times 10^{-5}$

The optical pickup apparatus written in item 52 is characterized in that: in the invention of item 50 or 51, the objective optical element satisfies the following condition.

$0 < A < 8 \times 10^{-4}$

The optical pickup apparatus written in item 53 is characterized in that: in any one of the inventions of items 49-52, the particles are inorganic material.

The optical pickup apparatus written in item 54 is characterized in that: in the invention of item 53, the inorganic material is the oxide.

The optical pickup apparatus written in item 55 is characterized in that: in the invention of item 54, the oxide is in saturate oxidation state.

The optical pickup apparatus written in item 56 is characterized in that: in any one of the inventions of item 49-55, the antioxidant is added in the resin.

The optical pickup apparatus written in item 57 is characterized in that: in any one of the inventions of item 49-56, the volume ratio of the resin and the particle is 9:1-3:2.

The objective optical element written in item 58 is characterized in that: in the objective optical element of the optical pickup apparatus by which the reproducing and/or recording of the information is conducted when the first light flux of the wavelength λ1 emitted from the first light source forms a converging spot on the information recording surface of the first optical information recording medium of the protective substrate thickness t1, the reproducing and/or recording of the information is conducted when the second light flux of the wavelength λ2 (λ1<λ2) emitted from the second light source forms a converging spot on the information recording surface of the second optical information recording medium of the protective substrate thickness t2 (t1≦t2), and the reproducing and/or recording of the information is conducted when the third light flux of the third wavelength λ3 (λ2<λ3) emitted from the third light source forms a converging spot on the information recording surface of the third optical information recording medium of the protective substrate thickness t3 (t2≦t3), the objective optical element is an objective optical element of one group composition which is commonly used for the first to the third optical information recording media, which has 2 phase structures of the first phase structure and the second phase structure, and whose at least one surface is aspheric surface, and the light using efficiency of any one light flux of the first light flux to the third light flux is less than 50%.

When the objective optical element is composed of one group, the size reduction of the actuator to drive the objective optical element can be attained by the simplification of the manufacturing process, cost reduction, weight reduction. Further, when the first optical information recording medium and the second optical information recording medium are made compatible by the first phase structure, and when the second optical information recording medium and the third optical information recording medium are made compatible by the second phase structure, further, when the light using efficiency of any one light flux is made less than 50%, the difference of the magnification among 3 wavelengths can be reduced.

Hereupon, the "light using efficiency" referred herein, means that, when, by the objective optical element of the present invention, the light amount in the Airy disk of the converging spot formed on the information recording surface of the optical information recording medium is A, and when, by the objective optical element which is formed of the same material and which has the same focal distance, on-axis thickness, numerical aperture, wave-front aberration, and in which the first phase structure and the second phase structure are not formed, the light amount in the Airy disk of the converging spot formed on the information recording surface of the optical information recording medium is B, it is calculated by A/B.

The objective optical element written in item 59 is characterized in that: in the invention written in item 58, the light flux in which the light using efficiency is less than 50% is that of the third wavelength, and the light using efficiencies of the first light flux and the second light flux are both more than 75%.

When the light flux whose light using efficiency is less than 50%, is the light flux of the third wavelength, even in the case where the first wavelength λ1 is about 2 times of the third wavelength λ3 (for example, a case where the first wavelength λ1 is the blue violet wavelength, and the third wavelength λ3 is the infrared wavelength), because the spherical aberration to the third light flux can be corrected by the action of the phase structure, the recording/reproducing characteristic on the third optical information recording medium can be increased. Further, because the light using efficiencies of the first light flux and the second light flux are both more than 75%, the objective optical element which can cope with also the high-speed writing in the first optical information recording medium or the second optical information recording medium, for which it is required that the recording density is large and the recording speed is increased, can be provided.

The objective optical element written in item 60 is characterized in that: in the inventions of item 58 or 59, the first phase structure is a superimposed type diffractive structure in which patterns whose sectional shape including the optical axis is a stair-shape, are concentric circularly arranged and for each number of a predetermined level surfaces, steps are shifted by the height for number of steps corresponding to the number of level surfaces, and the superimposed type diffractive structure has the wavelength selectivity which does not diffract the first light flux and the third light flux, but diffract the second light flux.

When the superimposed type diffractive structure having the wavelength selectivity of the diffraction action written in item 60 as the first phase structure, is used, because the phase of the second light flux can be independently controlled, the spherical aberration to the second light flux can be finely corrected. As the result, the objective optical element which is excellent for the recording/reproducing characteristic on the second optical information recording medium can be provided.

Because the objective optical element written in item 61 is characterized in that: in the invention written in item 60, the optical path difference added to the first light flux by the step difference for one of the superimposed type diffractive structure is 2×λ1, when the step difference for one of the superimposed type diffractive structure is set to the depth corresponding to 2 times of the first wavelength λ1 in the optical path difference conversion, the high diffraction efficiency (transmission factor) also for the light flux of any wavelength can be secured.

The objective optical element written in item 62 is characterized in that: in the invention written in item 61, the predetermined number of level surfaces is 5. In the superimposed type diffractive structure, the diffraction efficiency of the light flux which receives the diffraction action depends on not only the step difference for one, but also on the number of level surfaces. When the number of level surfaces is set to 5, the diffraction efficiency of the second light flux can be increased to the maximum.

The objective optical element written in item 63 is characterized in that: in the invention written in item 58 or 59, the first phase structure is a saw-toothed diffractive structure, and when the diffraction order having the maximum diffraction light amount in the diffraction light generated when the first light flux is incident on the saw-toothed diffractive structure, is dor1, the diffraction order having the maximum diffraction light amount in the diffraction light generated when the second light flux is incident on the saw-toothed diffractive structure, is dor2, and the diffraction order having the maximum diffraction light amount in the diffraction light generated when the third light flux is incident on the saw-toothed diffractive structure, is dor3, it satisfies the following expression, and the objective optical element condenses; the dor1$^{th}$-order diffraction light of the first light flux on the information recording surface of the first optical information recording medium; the dor2$^{th}$-order diffraction light of the second light flux on the information recording surface of the second optical information recording medium; and the dor3$^{th}$-order diffraction light of the third light flux on the information recording surface of the third optical information recording medium.

dor1>dor2≧dor3, where, dor1 is even number.

The saw-toothed type diffractive structure having the wavelength selectivity of the diffraction order written in item 63 may also be used as the first phase structure, in this case, it has the high diffraction efficiency for the light flux of any wavelength, and can finely correct the spherical aberration to the second light flux.

The objective optical element written in item 64 is characterized in that: in the invention written in item 63, the diffraction order dor1 is 2, the diffraction order dor2 is 1, and the diffraction order dor3 is 1. When the diffraction order dor1 of the first light flux is 2, the diffraction order dor2 of the second light flux is 1, and the diffraction order dor3 of the third light flux is 1, the correction characteristic of the spherical aberration to the second light flux can be made best.

The objective optical element written in item 65 is characterized in that: in any one of the inventions of items 58 to 64, the second phase structure is a superimposed type diffractive structure in which patterns whose sectional shape including the optical axis is a stair-shape, are concentric circularly arranged and for each number of a predetermined level surfaces, steps are shifted by the height for number of steps corresponding to the number of level surfaces, and the superimposed type diffractive structure has the wavelength selectivity which does not diffract the first light flux and the second light flux, but diffract the third light flux.

When the superimposed type diffractive structure having the wavelength selectivity of the diffraction action written in item 65 as the first phase structure, is used, because the phase of the third light flux can be independently controlled, the spherical aberration to the third light flux can be finely corrected. As the result, the objective optical element which is excellent for the recording/reproducing characteristic on the third optical information recording medium can be provided.

The objective optical element written in item 66 is characterized in that: in the invention written in item 65, the optical path difference added to the first light flux by the step difference for one of the superimposed type diffractive structure is 5×λ1.

When the step difference for one of the superimposed type diffractive structure is set to the depth corresponding to five times of the first wavelength λ1 in the optical path conversion, the optical path difference added to the second light flux by this step difference is third times of the second wavelength λ2. Hereby, the transmission factor of the first light flux and the second light flux can be improved, and the objective optical element which can cope also with the high speed writing in the first optical information recording medium and the second optical information recording medium can be provided.

The objective optical element written in item 67 is characterized in that: in the invention written in item 66, the predetermined number of level surfaces is 2. When the number of level surfaces of the superimposed type diffractive structure is set to 2, the diffraction efficiency of the third light flux is about 40%, and while keeping the difference of the magnification among 3 wavelengths small, the spherical aberration to the third light flux can be corrected. Hereby, an optical element other than the objective optical element can also be made in common-use among light fluxes of 3 wavelengths, and the down-sizing and cost reduction of the optical pickup apparatus can be attained.

The objective optical element written in item 68 is characterized in that: in the invention written in item 67, when the third light flux is incident on the superimposed type diffractive structure, almost all of the light amount is distributed to 2 diffraction light, and the objective optical element condenses the diffraction light in the 2 diffraction light whose focal position is far from the objective optical element on the information recording surface of the third optical information recording medium. In the superimposed type diffractive structure in which the number of level surfaces is set in this manner, almost all of the light amount of the third light flux is distributed to ±1-order diffraction light. In these two diffraction light, when the diffraction pitch of the superimposed type diffractive structure is determined so that the spherical aberration of the diffraction light whose focal position is farther from the objective optical element is corrected, the working distance to the third optical information recording medium can be secured enough.

The objective optical element written in item 69 is characterized in that: in the invention written in any one of items 58 to 64, the second phase structure is a saw-toothed diffractive structure, and when the diffraction order having the maximum diffraction light amount in the diffraction light generated when the first light flux is incident on the saw-toothed diffractive structure, is dor1', the diffraction order having the maximum diffraction light amount in the diffraction light generated when the second light flux is incident on the saw-toothed diffractive structure, is dor2', and the diffraction order having the maximum diffraction light amount in the diffraction light generated when the third light flux is incident on the saw-toothed diffractive structure, is dor3', it satisfies the following expression, and the objective optical element condenses; the dor1'$^{th}$-order diffraction light of the first light flux on the information recording surface of the first optical information recording medium; the dor2'$^{th}$-order diffraction light of the second light flux on the information recording surface of the second optical information recording medium; and the dor3'$^{th}$-order diffraction light of the third light flux on the information recording surface of the third optical information recording medium.

dor1'>dor2'≧dor3', where, dor1' is odd number.

The saw-toothed type diffractive structure having the wavelength selectivity of the diffraction order written in item 69 may also be used as the second phase structure, in this case, it has the high diffraction efficiency for the first light flux and the second light flux, and can finely correct the spherical aberration to the third light flux. As the result, an objective optical element excellent for the recording/reproducing characteristic on the third optical information recording medium can be provided.

The objective optical element written in item 70 is characterized in that: in the invention written in item 69, the diffraction order dor1' is 3, the diffraction order dor2' is 2, and the diffraction order dor3' is 2. When the diffraction order dor1' of the first light flux is 3, the diffraction order dor2' of the second light flux is 2, and the diffraction order dor3' of the third light flux is 1, the diffraction efficiency of the third light flux is about 45%, and while keeping the difference of the magnification among 3 wavelengths small, the spherical aberration to the third light flux can be corrected. Hereby, an optical element other than the objective optical element can also be made in common-use among light fluxes of 3 wavelengths, and the down-sizing and cost reduction of the optical pickup apparatus can be attained.

The objective optical element written in item 71 is characterized in that: in the invention written in any one of items 58 to 70, the first phase structure is formed on the optical surface on the light source side, and the second phase structure is formed on the optical surface on the optical information recording medium side. Hereby, the ring-shaped zone pitch of the first phase structure whose spherical aberration amount to be corrected is larger than that of the second phase structure can be secured large.

The objective optical element written in item 72 is characterized in that: in the invention written in any one of items 58 to 71, when the designed magnification to the first wavelength is m1, the designed magnification to the second wavelength is m2, and the designed magnification to the third wavelength is m3, it satisfies the following expression.

$$m1=m2=0$$

$$-0.15 \leq m3 \leq 0$$

When the above expression is satisfied, the coma generated by the tracking drive at the time of the recording/reproducing on the first optical information recording medium and the second optical information recording medium can be made 0, and the spherical aberration to the third light flux can be finely corrected.

The objective optical element written in item 73 is characterized in that: in the invention written in any one of items 58 to 72, it is made of low melting point glass whose transition point Tg is less than 400° C. When such low melting point glass is used, the life-elongation of the molding die can be intended, and because the viscosity at the time of melting is low, the phase structure can be finely transferred by the molding. As such low melting point glass whose transition point is lass than 400° C., there is K-PG325, K-PG375 made by Sumita Kogaku Co.

The objective optical element written in item 74 is characterized in that: in the invention written in any one of items 58 to 72, it is made of resin. When the resin is used for the objective optical element, the mass production can be conducted with the stable performance and the low cost, and because it is light weight, the power consumption of the actuator for the focus drive or tracking drive requires small, and the size of the actuator can be reduced. Further, because the viscosity in the melting state is low, the phase structure can be finely transferred by the molding.

The objective optical element written in item 75 is characterized in that: in the invention written in any one of items 58 to 72, it is formed in such a manner that resin layer is pasted together to the surface of glass-made lens, and in the surface of the resin layer, the first phase structure or the second phase structure is formed. When the glass base material is used, the objective optical element whose temperature characteristic is excellent can be provided. Hereupon, as the material used as the resin layer, the ultraviolet ray hardening resin or thermo-hardening resin is suitable in the manufacturing.

The objective optical element written in item 76 is characterized in that: in the invention written in item 74 or 75, particles whose sign of the refractive index change rate following the temperature change is reverse to the resin, and whose diameter is less than 30 nm are dispersed in the resin.

When particles whose sign of the refractive index change ratio following the temperature change is reverse to the resin, and whose diameter is less than 30 nm are dispersed in the resin, the material, while keeping the moldability of resin, whose refractive index change following the temperature change is small is obtained. Hereby, the mass production can be conducted with the stable performance and low cost by the molding, and the objective optical element whose weight is light and whose refractive index change following the temperature change is small can be provided.

In the present specification, it is assumed that the objective optical element is, in the state that the optical information recording medium is loaded in the optical pickup apparatus, an optical element having the converging action which is arranged in the position closest to the optical information recording medium side, and oppositely to this.

EFFECT OF THE INVENTION

According to the present invention, in the optical pickup apparatus in which the objective optical system is mounted, which has the phase structure and by which the recording and/or reproducing of the information can be adequately conducted on 3 kinds of disks whose recording densities are different each other, including the high density optical disk, DVD and CD-using the blue violet laser light source, the optical pickup apparatus in which the structure can be simplified and cost can be reduced, and the objective optical element can be obtained.

Using the drawings, embodiments of the present invention will be described below. Initially, using FIG. 1, an optical pickup apparatus according to the present embodiment will be described. Hereupon, the optical pickup apparatus PU1 according to the present embodiment can be mounted in an optical disk drive apparatus.

FIG. 1 is a view schematically showing the structure of the optical pickup apparatus PU1 by which the recording/reproducing of the information can be adequately conducted on whichever in the high density optical disk BD, DVD and CD. The optical specification of BD is the wavelength $\lambda 1=405$ nm, the thickness t of the protective layer PL1=0.1 mm, and the numerical aperture NA1=0.85, the optical specification of DVD is the wavelength $\lambda 2=655$ nm, the thickness t2 of the protective layer PL2=0.6 mm, and the numerical aperture NA2=0.65, and the optical specification of CD is the wavelength $\lambda 3=785$ nm, the thickness t3 of the protective layer PL3=1.2 mm, and the numerical aperture NA3=0.51. However, a combination of the wavelength, the thickness of the protective layer, and the numerical aperture is not limited to this.

The optical pickup apparatus PU1 is structured by: the laser module LM which consists of: the blue violet semiconductor laser LD (the first light source) which is light emitted when the recording/reproducing of the information is conducted on BD, and which projects the blue violet laser light flux (the first light flux) of 405 nm; the second light emitting point EP1 (the second light source) which is light emitted when the recording/reproducing of the information is conducted on DVD, and which projects the laser light flux (the second light flux) of 655 nm; the second light emitting point EP2 (the third light source) which is light emitted when the recording/reproducing of the information is conducted on CD, and which projects the laser light flux (the third light flux) of 785 nm; the first light receiving section DS1 which light receives the reflection light flux from the information recording surface RL2 of DVD; the second light receiving section DS2 which light receives the reflection light flux from the information recording surface RL3 of CD; and the prism PS, and the photo-detector PD for BD; the objective optical element OL having the function for converging the incident laser light flux on the information recording surfaces RL1, RL2, RL3, and whose double surfaces are aspheric surfaces, and in which the first phase structure is provided on the light source side, and the second phase structure is provided on the optical disk side; 2-axis actuator AC1; 1-axis actuator AC2; the beam expander EXP composed of the first lens L1 and the second lens L2 which are arranged in the common optical path through which the first to the third light fluxes are commonly passed and which can be shifted in the optical axis direction by the 1-axis actuator AC2; the first polarizing beam splitter BS1; the second polarizing beam splitter BS2; the ¼ wavelength plate QWP; the sensor lens SEN for adding the astigmatism to the reflection light flux from the information recording surface RL1; the first collimator COL1 which is arranged in the exclusive use optical path through which only the first light flux passes and by which the first light flux is converted into the parallel light flux; and the second collimator COL2 by which the second light flux and the third light flux are converted into the parallel light fluxes. Hereupon, as the light source for BD, the blue violet SHG laser can also be used other than the blue violet semiconductor laser LD1.

In the optical pickup apparatus PU1, when the recording/reproducing of the information is conducted on BD, after the position in the optical axis direction of the lens L1 is adjusted by the 1-axis actuator AC2 so that the first light flux is emitted from the beam expander EXP under the state of the parallel light flux, the blue violet semiconductor laser LD is light emitted. The divergent light flux emitted from the blue violet semiconductor laser LD1 is, as its ray of light path is drawn by a solid line in FIG. 1, after the flux is reflected by the first polarizing beam splitter BS1, converted into the parallel light flux by the collimator, its diameter is enlarged by the beam expander EXP, it passes the ¼ wavelength plate QWP, and the light flux diameter is regulated by the stop which is not shown, and after it is incident on the objective optical element OL under the parallel light, it becomes a spot formed on the information recording surface RL1 through the protective layer PL1 of BD from there. In this case, it is structured in such a manner that, by only the refraction action which is owned by the aspheric surface, or by a combination of the concerned refraction action and the optical action given by at least one of the first phase structure and the second phase structure, the converging spot is formed on the information recording surface RL1 of BD. The objective optical element OL conducts the focusing or tracking by the 2-axis actuator AC1 arranged in its periphery.

After the reflected light flux modulated by the information pit on the information recording surface RL1 transmits again the objective optical element OL, ¼ wavelength plate QWP, beam expander EXP and the second polarizing beam splitter BS2, it is made a converging light flux by the collimator COL1, and after it transmits the first polarizing beam splitter BS1, the astigmatism is added to it by the sensor lens SEN, and the flux is converged on the light receiving surface of the photo-detector PD. Then, by using the output signal of the photo-detector PD, the information recorded in BD can be read.

Further, In the optical pickup apparatus PU1, when the recording/reproducing of the information is conducted on DVD, after the position in the optical axis direction of the lens L1 is adjusted by the 1-axis actuator AC2 so that the second light flux is emitted from the beam expander EXP under the state of the parallel light flux, the first light emitting point EP1 is light emitted. The divergent light flux emitted from the first light emitting point EP1 is, as its ray of light path is drawn by a broken line in FIG. 1, after the flux is reflected by the prism PS, converted into the parallel light flux by the second collimator. After that, the flux is reflected by the second polarizing beam splitter BS2, and after its diameter is enlarged by the beam expander EXP, it passes the ¼ wavelength plate QWP, and after it is incident on the objective optical element OL under the parallel light, it becomes a spot formed on the information recording surface RL2 through the protective layer PL2 of DVD from there. In this case, it is structured in such a manner that, by a combination of the refraction action which is owned by the aspheric surface, and the optical action given by at least one of the first phase structure and the second phase structure, the converging spot is formed on the information recording surface RL2 of DVD. The objective optical element OL conducts the focusing or tracking by the 2-axis actuator AC1 arranged in its periphery.

After the reflected light flux modulated by the information pit on the information recording surface RL2 transmits again the objective optical element OL, ¼ wavelength plate QWP, beam expander EXP, it is reflected by the second polarizing beam splitter BS2, and it is converted into a converging light flux by the second collimator COL2. After that, after it is reflected two times in the prism, the flux is converged on the first light receiving section DS1. Then, by using the output signal of the first light receiving section DS1, the information recorded in DVD can be read.

Further, in the optical pickup apparatus. PU1, when the recording/reproducing of the information is conducted on CD, after the position in the optical axis direction of the lens L1 is adjusted by the 1-axis actuator AC2 so that the third light flux is emitted from the beam expander EXP under the state of the parallel light flux, the second light emitting point EP2 is light emitted. The divergent light flux emitted from the second light emitting point EP2 is, as its ray of light path is drawn by a one-dotted chain line in FIG. 1, after the flux is reflected by the prism PS, converted into the parallel light flux by the second collimator COL2. After that, the flux is reflected by the second polarizing beam splitter BS2, and after its diameter is enlarged by the beam expander EXP, it passes the ¼ wavelength plate QWP, and after it is incident on the objective optical element OL under the state of the parallel light or less finite divergent light, it becomes a spot formed on the information recording surface RL3 through the protective layer PL3 of CD from there. In this case, it is structured in such a manner that, by a combination of the refraction action which is owned by the aspheric surface of the objective optical element OL, and the optical action given by at least one of the first phase structure and the second phase structure, the converging spot is formed on the information recording surface RL3 of CD. The objective optical element OL conducts the focusing or tracking by the 2-axis actuator AC1 arranged in its periphery.

After the reflected light flux modulated by the information pit on the information recording surface RL3 transmits again the objective optical element OL, ¼ wavelength plate QWP, beam expander EXP, it is reflected by the second polarizing beam splitter BS2, and it is converted into a converging light flux by the second collimator COL2. After that, after it is reflected two times in the prism, the flux is converged on the second light receiving section DS2. Then, by using the output signal of the second light receiving section DS2, the information recorded in CD can be read.

Hereupon, in the present embodiment, in the case where the refractive index change is generated due to the temperature change on the objective optical element on which the first light flux for BD or the second light flux for DVD is incident, when, corresponding to that, the lens L1 of the beam expander EXP which is the temperature correcting element, is moved in the optical axis direction by the actuator AC2, the generating spherical aberration can be corrected.

Or, in the present embodiment, in the case where the first light flux for BD is incident on the objective optical element OL, when the lens L1 of the beam expander EXP which is the chromatic aberration correcting element, is moved in the optical axis direction by the actuator AC2, the generating chromatic aberration can be corrected.

Such a temperature correcting element or chromatic aberration correcting element is not limited to the beam expander EXP, but the first collimator COL1 may also be used. In such a case, the first collimator COL1 may be moved in the optical axis direction, however, when the phase structure is provided on its optical surface, the spherical aberration based on the refractive index change due to the temperature change or chromatic aberration can be corrected.

The above-described objective optical element OL is preferable when it is formed of the glass or the resin in which the oxide whose diameter is less then 30 nm is dispersed.

Generally, when minute powders are mixed in the transparent resin material, because the scattering of the light is generated, and transmission factor is lowered, it is difficult to be used as the optical material, however, when the minute powder is made a size which is smaller than the wavelength of the transmission light flux, it is found that the scattering does not generate actually.

Hereupon, in the plastic resin (simply called resin), when the temperature rises, the refractive index is lowered, however, in the inorganic particle, when the temperature rises, the refractive index is increased. Therefore, it is also well known that, when these features are acted so as to cancelled together, the refractive index change is not generated. The optical element of the present invention is formed of the material in which the inorganic particles of less than 30 nm, preferably less than 20 nm, more preferably 10-15 nm are dispersed in the resin of the base material. Therefore, the optical element having no temperature dependency, or very low temperature dependency, can be provided.

For example, minute particles of niobium oxide ($Nb_2O_5$) are dispersed in acrylic resin. The plastic as the base material is 80 in the volumetric ratio, and in the niobium oxide, it is the ratio of about 20, and they are uniformly mixed. Although there is a problem that the minute particles are easily flocculated, a necessary dispersion condition can be generated by such a technology that the electric charges are given to the particle surfaces and particles are dispersed.

As will be described later, the mixing•dispersion of the resin and particles is preferable that it is conducted in in-line at the time of injection molding of the optical element. In other words, after the mixing•dispersion, it is preferable that the material is not cooled•solidified, until it is molded into the optical element.

Hereupon, this volumetric ratio can be appropriately increased and decreased for controlling the ratio of change to the temperature of the refractive index, and a plurality of kinds of nano-size inorganic particles can be blended and dispersed.

In the above example, the ratio is 80:20, that is, 4:1, however, it can be appropriately adjusted in the range from 90:10 (9:1) to 60:40 (3:2). When it is smaller than 9:1, the effect of the temperature change suppression becomes small, inversely, when it exceeds 3:2, it is not preferable because a problem is generated in the moldability of the resin.

It is preferable that the minute particle is an inorganic substance, and further, it is preferable that it is an oxide. Then, it is preferable that the oxidation condition is saturated, and the particle is an oxide which is not oxidized further more.

A matter that it is an inorganic substance, is preferable for the reason that the reaction to the plastic resin which is a high polymer organic compound, can be suppressed to low, further from the reason that it is an oxide, the deterioration following the use can be prevented. Particularly, in a severe condition such as highly temperature-rising, or that laser light is irradiated, the oxidation is easily accelerated, however, when it is such a particle of an inorganic oxide, the deterioration by the oxidation can be prevented.

Further, for preventing the oxidation of the resin due to the other factors, it is of course that the anti-oxidant can be added. In this connection, as the plastic resin which will be the base material, the resins as written in Tokugan No. 2002-308933, Tokugan No. 2002-309040, Tokugan No. 2002-308964, can be appropriately preferably adopted.

Next, a method for molding the objective optical element of the present embodiment will be described. As described above, as a technology that particles are dispersed in the plastic resin, a method that the electric charges are given to the particles is well known.

For example, pellet-like plastic resin is charged into a chamber, particles are injected dispersed in the chamber, the chamber is heated, and the plastic resin is fused. In this manner, the dispersed particles are dispersed in the fused plastic resin. In this case, for preventing the precipitation, mixing, applying the electric field•magnetic field, applying the ultrasonic wave, are also possible.

Further, when the fused plastic resin is injection molded, a method by which particles are added by using the in-line mixer is also considered. In this case, because it is spirally mixed on line, the dispersion condition can be preferably made.

Herein, after the plastic resin in which minute particles are dispersed, is cooled•solidified once, when it is fused again and injection molded, because there is a possibility that the dispersion condition is changed or the minute burning is generated in the resin in the periphery of the particle by re-heating, re-fusing, it is not preferable. Particularly, when the burning is generated, there is a possibility that the transmission factor of the ray of light is lowered depending on the part of the burning, and it can not be used as the optical element.

Accordingly, when the plastic resin is fused once and particles are dispersed, it is preferable that, while keeping the fused and dispersed condition, the molding product is obtained. That is, it is preferable that, after in the plastic resin under the fused condition, particles whose diameter is less than 30 nano-meter are dispersed, it is flowed in the molding die while keeping the fusing condition, and the molding product is obtained.

In the above embodiment, as an example of the high density optical disk, BD is described, however, even in the case of HD DVD, in the same manner, the recording and/or reproducing of the information can be compatibly conducted. Further, in Examples 1-4 which will be described below, it is structured in such a manner that the peripheral area of the objective lens is the aspheric surface having no diffractive structure, and when the light flux of a predetermined wavelength passes, a flare light is generated by only the refraction action, and an adequate converging spot is formed, however, in order to avoid the bad influence of the flare light and to positively conduct the aperture limitation, as in Example 5, the diffractive structure can also be provided here.

Example 1

Further, when melted plastic resins are subjected to injection molding, a method to add particles by the use of an in-line mixer is also considered. In this case, it is possible to create the state of dispersion preferably, because mixing is conducted in a spiral form on the line.

In this case, if plastic resins in which fine particles are dispersed are cooled and solidified, and then, are melted and injection-molded again, repeated heating and repeated melting cause possibility that the state of dispersion is changed and microscopic burned spots are generated around a particle, which is not preferable. When the burned spots are generated, in particular, light beam transmittance is lowered, depending on a region of the burned spot, resulting in a fear that a molded product cannot be used as an optical element.

It is therefore preferable to obtain a molded product while maintaining the state of melting and dispersion, after melting plastic resins and dispersing particles. Namely, it is preferable that particles each having a diameter of not more than 30 nm are dispersed in melted plastic resins, and then, the melted plastic resins are made to flow in a mold while the state of melting is maintained, to obtain a molded product.

In the embodiment stated above, though BD is used as an example of a high density optical disc, it is also possible to conduct recording and/or reproducing of information on a compatible basis in the same way, even for HD DVD. In the examples 1-4 described below, a peripheral area of the objective lens is an aspheric surface having no diffractive structure, and when a light flux having a prescribed wavelength passes through the area, a flare is generated only by a refracting action, to form an appropriate light-converged spot. However, for conducting aperture restriction positively by avoiding bad influence of the flare, a diffractive structure may be provided in this place, as shown in Example 5.

Example 1

Next, the example will be explained as follows. Example 1 shows an objective optical element that is fitted to an optical pickup device shown in FIG. 1. Lens data of Example 1 are shown in Table 1. Incidentally, from now on, an exponent of 10 (e.g., $2.5 \times 10^{-3}$) is assumed to be indicated with E (e.g., 2.5E-3).

TABLE 1

Example 1 Lens data

| | | | | | | | |
|---|---|---|---|---|---|---|---|
| Focal length of objective lens | | $f_1 = 2.2$ mm | | $f_2 = 2.15$ mm | | $f_3 = 2.82$ mm | |
| Numerical aperture on image surface side | | NA1: 0.85 | | NA2: 0.65 | | NA3: 0.51 | |
| Magnification | | m1: 0 | | m2: 0 | | m3: 0 | |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | | ∞ | | ∞ | | ∞ | |
| 1 (Aperture diameter) | | 0.0 (φ 3.74 mm) | | 0.0 (φ 3.74 mm) | | 0.0 (φ 3.74 mm) | |

TABLE 1-continued

| | | | | | | | |
|---|---|---|---|---|---|---|---|
| 2 | 1.4039 | 2.60 | 1.5245 | 2.60 | 1.5066 | 2.60 | 1.5035 |
| 2' | 1.4039 | 0.00 | | 0.00 | | 0.00 | |
| 3 | −2.3504 | 0.75 | 1.0000 | 0.29 | 1.0000 | 0.31 | 1.0000 |
| 3' | −2.3504 | 0.00 | | 0.00 | | 0.00 | |
| 4 | ∞ | 0.875 | 1.6183 | 0.6 | 1.5776 | 1.2 | 1.5706 |
| 5 | ∞ | | | | | | |

*The symbol di' shows a displacement form $di^{th}$ surface to $d^{th}$ surface.

$2^{nd}$ surface (0 mm ≦ h ≦ 1.396 mm)
Aspheric surface coefficient

| | |
|---|---|
| κ | −6.6732E−01 |
| A4 | 7.3613E−03 |
| A6 | 3.0191E−03 |
| A8 | −6.2762E−04 |
| A10 | 2.6178E−04 |
| A12 | 4.8457E−05 |
| A14 | −1.4395E−05 |
| A16 | −3.5924E−06 |
| A18 | −1.5168E−06 |
| A20 | 1.0180E−06 |

Optical path difference function (HD DVD: $0^{th}$ order DVD: $1^{st}$ order CD: $0^{th}$ order Manufacturing wavelength 658 nm)

| | |
|---|---|
| C2 | −1.8828E−02 |
| C4 | −2.8988E−03 |
| C6 | −1.3584E−05 |
| C8 | −2.5296E−04 |
| C10 | 1.3257E−05 |

$2'^{th}$ surface (1.396 mm < h)
Aspheric surface coefficient

| | |
|---|---|
| κ | −6.6732E−01 |
| A4 | 7.3613E−03 |
| A6 | 3.0191E−03 |
| A8 | −6.2762E−04 |
| A10 | 2.6178E−04 |
| A12 | 4.8457E−05 |
| A14 | −1.4395E−06 |
| A16 | −3.5924E−06 |
| A18 | −1.5168E−06 |
| A20 | 1.0180E−06 |

$3^{rd}$ surface (0 mm ≦ h ≦ 0.75 mm)
Aspheric surface coefficient

| | |
|---|---|
| κ | −2.7335E+01 |
| A4 | 1.2205E−01 |
| A6 | −1.6468E−01 |
| A8 | 1.1636E−01 |
| A10 | −4.2162E−02 |
| A12 | 5.8170E−03 |

Optical path difference function (HD DVD: $0^{th}$ order DVD: $0^{th}$ order CD: $1^{st}$ order Manufacturing wavelength 785 nm)

| | |
|---|---|
| C2 | 1.1277E−01 |
| C4 | −1.8671E−01 |
| C6 | 2.8084E−01 |
| C8 | −3.0947E−01 |
| C10 | 1.5463E−01 |

$3'^{th}$ surface (0.75 mm < h)
Aspheric surface coefficient

| | |
|---|---|
| κ | −2.7335E+01 |
| A4 | 1.2205E−01 |
| A6 | −1.5468E−01 |
| A8 | 1.1636E−01 |
| A10 | −4.2162E−02 |
| A12 | 5.8170E−03 |

In the objective optical element in the present embodiment, a superposed diffractive structure is used for a first layer structure and for a second layer structure. Incidentally, an optical surface of the objective optical element is formed to be an aspheric surface which is prescribed by a numerical expression wherein a coefficient shown in Table 1 is substituted respectively in Numeral 3, and is symmetrical axially.

$$X(h) = \frac{(h^2/r)}{1 + \sqrt{1 - (1+k)(h/r)^2}} + \sum_{i=0}^{10} A_{2i} h^{2i}$$ (Numeral 3)

In the numerical expression above, X (h) represents an axis in the optical axis direction (the traveling direction of light is positive), κ represents a conic constant, $A_{2i}$ represents an aspheric surface coefficient and h represents a height from the optical axis.

An optical path length given by the diffractive structure to a light flux of each wavelength is prescribed by a numerical expression wherein a coefficient shown in Table 1 is substituted for the optical path difference function of Numeral 4.

$$\Phi(h) = \lambda/\lambda_B \times dor \times \sum_{i=0}^{6} C_{2i} h^{2i}$$ (Numeral 4)

In the numerical expression above, λ represents a wavelength of an incident light flux, λB represents a manufacturing wavelength (blazed wavelength), "dor" represents a diffraction order number and $C_{2i}$ represents a coefficient of an optical path difference function.

Example 2

Example 2 is one for an objective optical element which is fitted to the optical pickup device shown in FIG. 1. Lens data in Example 2 are shown in Table 2. In the objective optical element of the present example, a diffractive structure of a blazed type is used for the first layer structure and a diffractive structure of a superposed type is used for the second layer structure.

TABLE 2

Example 2 Lens data

| | | | | | | |
|---|---|---|---|---|---|---|
| Focal length of objective lens | | $f_1$ = 2.2 mm | | $f_2$ = 2.29 mm | | $f_3$ = 2.81 mm |
| Numerical aperture on image surface side | | NA1: 0.85 | | NA2: 0.65 | | NA3: 0.51 |
| Magnification | | m1: 0 | | m2: 0 | | m3: 0 |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | | ∞ | | ∞ | | ∞ | |
| 1 (Aperture diameter) | | 0.0 (φ 3.74 mm) | | 0.0 (φ 2.98 mm) | | 0.0 (φ 2.98 mm) | |
| 2 | 1.1524 | 2.60 | 1.5245 | 2.60 | 1.5066 | 2.60 | 1.5035 |
| 2' | 1.1524 | 0.00 | | 0.00 | | 0.00 | |
| 3 | −2.3408 | 0.75 | 1.0000 | 0.52 | 1.0000 | 0.31 | 1.0000 |
| 3' | −2.3408 | 0.00 | | 0.00 | | 0.00 | |
| 4 | ∞ | 0.875 | 1.6183 | 0.6 | 1.5776 | 1.2 | 1.5706 |
| 5 | ∞ | | | | | | |

*The symbol di' shows a displacement form $di^{th}$ surface to $d'^{th}$ surface.

$2^{nd}$ surface (0 mm ≤ h ≤ 1.433 mm)
Aspheric surface coefficient

| | |
|---|---|
| κ | −7.6832E−01 |
| A4 | −1.5305E−02 |
| A6 | 1.2695E−02 |
| A8 | −5.8253E−03 |
| A10 | 5.6461E−04 |
| A12 | 1.8930E−04 |
| A14 | −4.4422E−05 |
| A16 | −7.6388E−06 |
| A18 | 2.2392E−05 |
| A20 | 4.4683E−07 |

Optical path difference function (HD DVD: $6^{th}$ order DVD: $4^{th}$ order CD: $3^{rd}$ order Manufacturing wavelength 408 nm)

| | |
|---|---|
| C2 | 6.8377E−03 |
| C4 | −2.3350E−03 |
| C6 | 8.9466E−04 |
| C8 | −5.5180E−04 |
| C10 | 8.1720E−05 |

$2'^{th}$ surface (1.433 mm < h)
Aspheric surface coefficient

| | |
|---|---|
| κ | −7.6632E−01 |
| A4 | −1.5305E−02 |
| A6 | 1.2695E−02 |
| A8 | −5.8253E−03 |
| A10 | 5.6461E−04 |
| A12 | 1.8930E−04 |
| A14 | −4.4422E−05 |
| A16 | −7.6388E−06 |
| A18 | 2.2392E−06 |
| A20 | 4.4683E−07 |

TABLE 2-continued

Optical path difference function (HD DVD: $3^{rd}$ order DVD: $2^{nd}$ order Manufacturing wavelength 408 nm)

| | |
|---|---|
| C2 | 1.3675E−02 |
| C4 | −4.6700E−03 |
| C6 | 1.7893E−03 |
| C8 | −1.1032E−03 |
| C10 | 1.6344E−04 |

$3^{rd}$ surface (0 mm ≦ h ≦ 0.736 mm) Aspheric surface coefficient

| | |
|---|---|
| κ | −2.6613E+01 |
| A4 | 2.0406E−01 |
| A6 | −2.5577E−01 |
| A8 | 1.8888E−01 |
| A10 | −7.0583E−02 |
| A12 | 1.0338E−02 |

Optical path difference function (HD DVD: $0^{th}$ order DVD: $0^{th}$ order CD: $1^{st}$ order Manufacturing wavelength 785 nm)

| | |
|---|---|
| C2 | 1.1013E−01 |
| C4 | −1.7553E−01 |
| C6 | 2.4351E−01 |
| C8 | −2.3995E−01 |
| C10 | 1.0637E−01 |

$3'^{th}$ surface (0.736 mm < h) Aspheric surface coefficient

| | |
|---|---|
| κ | −2.6613E+01 |
| A4 | 2.0406E−01 |
| A6 | −2.5577E−01 |
| A8 | 1.8888E−01 |
| A10 | −7.0583E−02 |
| A12 | 1.0338E−02 |

Example 3

Example 3 has the same structure as in the optical pickup device shown in FIG. 1, except that it is for an objective optical element which is fitted to an optical pickup device capable of conducting recording and/or reproducing of information for HD DVD instead of BD. Lens data in Example 3 are shown in Table 3. In the objective optical element of the present example, a diffractive structure of a blazed type is used for the first layer structure and a diffractive structure of a superposed type is used for each of the first layer structure and the second layer structure.

TABLE 3

Example 3 Lens data

| | | | | | | |
|---|---|---|---|---|---|---|
| Focal length of objective lens | | $f_1$ = 2.2 mm | | $f_2$ = 2.00 mm | | $f_3$ = 1.69 mm |
| Numerical aperture on image surface side | | NA1: 0.65 | | NA2: 0.65 | | NA3: 0.51 |
| Magnification | | m1: 0 | | m2: 0 | | m3: 0 |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | ∞ | | | ∞ | | ∞ | |
| 1 (Aperture diameter) | | 0.0 (φ 2.84 mm) | | 0.0 (φ 2.84 mm) | | 0.0 (φ 2.84 mm) | |
| 2 | 1.3800 | 1.50 | 1.5245 | 1.50 | 1.5066 | 1.50 | 1.5035 |
| 2' | 1.3800 | 0.00 | | 0.00 | | 0.00 | |
| 3 | −4.4079 | 1.01 | 1.0000 | 0.76 | 1.0000 | 0.31 | 1.0000 |
| 3' | −4.4079 | 0.00 | | 0.00 | | 0.00 | |
| 4 | ∞ | 0.6 | 1.6183 | 0.6 | 1.5776 | 1.2 | 1.5706 |
| 5 | ∞ | | | | | | |

*The symbol di' shows a displacement form $di^{th}$ surface to $d'^{th}$ surface.

$2^{nd}$ surface (0 mm ≦ h ≦ 1.3 mm) Aspheric surface coefficient

| | |
|---|---|
| κ | −6.4520E−01 |
| A4 | 6.8025E−03 |
| A6 | 3.0191E−03 |
| A8 | 2.4474E−04 |
| A10 | −9.1138E−05 |

TABLE 3-continued

| | |
|---|---|
| A12 | 1.2044E−04 |
| A14 | 1.0309E−05 |
| A16 | −1.0050E−05 |
| A18 | −1.4460E−05 |
| A20 | 6.5701E−06 |

Optical path difference function (HD DVD: $0^{th}$ order DVD: $1^{st}$ order CD: $0^{th}$ order Manufacturing wavelength 658 nm)

| | |
|---|---|
| C2 | −3.3305E−02 |
| C4 | −2.6706E−03 |
| C6 | 1.8429E−05 |
| C8 | −9.2718E−05 |
| C10 | 8.8964E−06 |

$2^{'th}$ surface (1.3 mm < h)
Aspheric surface coefficient

| | |
|---|---|
| κ | −6.4520E−01 |
| A4 | 6.8025E−03 |
| A6 | 3.0191E−03 |
| A8 | 2.4474E−04 |
| A10 | −9.1138E−05 |
| A12 | 1.2044E−04 |
| A14 | 1.0309E−05 |
| A16 | −1.0050E−05 |
| A18 | −1.4460E−05 |
| A20 | 6.5701E−08 |

$3^{rd}$ surface (0 mm ≦ h ≦ 0.60 mm)
Aspheric surface coefficient

| | |
|---|---|
| κ | −3.0933E+01 |
| A4 | 1.9137E−02 |
| A6 | −4.3591E−03 |
| A8 | −2.9782E−04 |
| A10 | 3.3395E−04 |
| A12 | 5.6412E−05 |

Optical path difference function (HD DVD: $0^{th}$ order DVD: $0^{th}$ order CD: $1^{st}$ order Manufacturing wavelength 785 nm)

| | |
|---|---|
| C2 | −1.2153E−01 |
| C4 | 4.3456E−02 |
| C6 | −2.1003E−02 |
| C8 | 8.2702E−03 |
| C10 | −1.6107E−03 |

$3^{'th}$ surface (0.60 mm < h)
Aspheric surface coefficient

| | |
|---|---|
| κ | −3.0933E+01 |
| A4 | 1.9137E−02 |
| A6 | −4.3591E−03 |
| A8 | −2.9782E−04 |
| A10 | 3.3395E−04 |
| A12 | 5.6412E−05 |

Example 4

Example 4 has the same structure as in the optical pickup device shown in FIG. 1, except that it is for an objective optical element which is fitted to an optical pickup device capable of conducting recording and/or reproducing of information for HD DVD instead of BD. Lens data in Example 4 are shown in Table 4. In the objective optical element of the present example, a diffractive structure of a blazed type is used for the first layer structure and a diffractive structure of a superposed type is used for the second layer structure.

TABLE 4

Example 4 Lens data

| focal length of objective lens | $f_1$ = 2.2 mm | $f_2$ = 2.31 mm | $f_3$ = 1.74 mm |
|---|---|---|---|
| Numerical aperture on image surface side | NA1: 0.65 | NA2: 0.61 | NA3: 0.51 |
| Magnification | m1: 0 | m2: 0 | m3: 0 |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | | ∞ | | ∞ | | ∞ | |
| 1 | | 0.0 | | 0.0 | | 0.0 | |

TABLE 4-continued

| (Aperture diameter) | | (φ 2.84 mm) | | (φ 2.84 mm) | | (φ 2.84 mm) | |
|---|---|---|---|---|---|---|---|
| 2 | 1.5159 | 1.50 | 1.5245 | 1.50 | 1.5066 | 1.50 | 1.5035 |
| 3 | −5.7723 | 0.96 | 1.0000 | 1.07 | 1.0000 | 0.31 | 1.0000 |
| 3' | −5.7723 | 0.00 | | 0.00 | | 0.00 | |
| 4 | ∞ | 0.6 | 1.6183 | 0.6 | 1.5776 | 1.2 | 1.5706 |
| 5 | ∞ | | | | | | |

*The symbol di' shows a displacement form $di^{th}$ surface to $d'^{th}$ surface.

$2^{nd}$ surface
Aspheric surface coefficient

| κ | −6.1907E−01 |
|---|---|
| A4 | 8.5993E−03 |
| A6 | 2.7776E−03 |
| A8 | 2.7481E−04 |
| A10 | −1.7620E−05 |
| A12 | 1.7408E−04 |
| A14 | 2.8144E−05 |
| A16 | −8.5368E−06 |
| A18 | −2.1074E−05 |
| A20 | 1.1988E−05 |

Optical path difference function (HD DVD: $2^{nd}$ order DVD: $1^{st}$ order CD: $1^{st}$ order Manufacturing wavelength 408 nm)

| C2 | −1.3357E−02 |
|---|---|
| C4 | −4.0635E−04 |
| C6 | 1.9526E−04 |
| C8 | −2.9677E−05 |
| C10 | 3.3852E−06 |

$3^{rd}$ surface (0 mm ≦ h ≦ 0.60 mm)
Aspheric surface coefficient

| κ | −5.8832E+01 |
|---|---|
| A4 | 2.0756E−02 |
| A6 | −4.3165E−03 |
| A8 | 3.0358E−04 |
| A10 | 1.5853E−03 |
| A12 | −8.0091E−05 |

Optical path difference function (HD DVD: $0^{th}$ order DVD: $0^{th}$ order CD: $1^{st}$ order Manufacturing wavelength 785 nm)

| C2 | −1.1125E−01 |
|---|---|
| C4 | 3.4458E−02 |
| C6 | −1.6304E−02 |
| C8 | 6.5328E−03 |
| C10 | −1.5883E−03 |

$3'^{th}$ surface (0.60 mm < h)
Aspheric surface coefficient

| κ | −5.8832E+01 |
|---|---|
| A4 | 2.0756E−02 |
| A6 | −4.3165E−03 |
| A8 | 3.0358E−04 |
| A10 | 1.5853E−03 |
| A12 | −8.0091E−05 |

Example 5

Example 5 has the same structure as in the optical pickup device shown in FIG. 1, except that it is for an objective optical element which is fitted to an optical pickup device capable of conducting recording and/or reproducing of information for HD DVD instead of BD. Lens data in Example 5 are shown in Table 5. In the objective optical element of the present example, a diffractive structure of a superposed type is used for each of the first layer structure and the second layer structure.

TABLE 5

Example 5 Lens data

| | | | | | | |
|---|---|---|---|---|---|---|
| Focal length of objective lens | | $f_1$ = 2.2 mm | | $f_2$ = 2.00 mm | | $f_3$ = 1.69 mm |
| Numerical aperture on image surface side | | NA1: 0.65 | | NA2: 0.65 | | NA3: 0.51 |
| Magnification | | m1: 0 | | m2: 0 | | m3: 0 |

| $i^{th}$ surface | ri | di (408 nm) | ni (408 nm) | di (658 nm) | ni (658 nm) | di (785 nm) | ni (785 nm) |
|---|---|---|---|---|---|---|---|
| 0 | | ∞ | | ∞ | | ∞ | |
| 1 (Aperture diameter) | | 0.0 (φ 2.84 mm) | | 0.0 (φ 2.84 mm) | | 0.0 (φ 2.84 mm) | |
| 2 | 1.3800 | 1.50 | 1.5245 | 1.50 | 1.5066 | 1.50 | 1.5035 |
| 2' | 1.3800 | 0.00 | | 0.00 | | 0.00 | |
| 3 | −4.4079 | 1.01 | 1.0000 | 0.76 | 1.0000 | 0.31 | 1.0000 |
| 3' | −4.4079 | 0.00 | | 0.00 | | 0.00 | |
| 4 | ∞ | 0.6 | 1.6183 | 0.6 | 1.5776 | 1.2 | 1.5706 |
| 5 | ∞ | | | | | | |

*The symbol di' shows a displacement form $di^{th}$ surface to $d^{ith}$ surface.

$2^{nd}$ surface (0 mm ≦ h ≦ 1.3 mm)
Aspheric surface coefficient

| | |
|---|---|
| κ | −6.4520E−01 |
| A4 | 6.8025E−03 |
| A6 | 3.0191E−03 |
| A8 | 2.4474E−04 |
| A10 | −9.1138E−05 |
| A12 | 1.2044E−04 |
| A14 | 1.0309E−05 |
| A16 | −1.0050E−05 |
| A18 | −1.4460E−05 |
| A20 | 6.5701E−06 |

Optical path difference function (HD DVD: $0^{th}$ order DVD: $1^{st}$ order CD: $0^{th}$ order Manufacturing wavelength 658 nm)

| | |
|---|---|
| C2 | −3.3305E−02 |
| C4 | −2.6706E−03 |
| C6 | 1.8429E−05 |
| C8 | −9.2718E−05 |
| C10 | 8.8964E−06 |

$2^{ith}$ surface (1.3 mm < h)
Aspheric surface coefficient

| | |
|---|---|
| κ | −6.4520E−01 |
| A4 | 6.8025E−03 |
| A6 | 3.0191E−03 |
| A8 | 2.4474E−04 |
| A10 | −9.1138E−05 |
| A12 | 1.2044E−04 |
| A14 | 1.0309E−05 |
| A16 | −1.0050E−05 |
| A18 | −1.4460E−05 |
| A20 | 6.5701E−06 |

$3^{rd}$ surface (0 mm ≦ h ≦ 0.60 mm)
Aspheric surface coefficient

| | |
|---|---|
| κ | −3.0933E+01 |
| A4 | 1.9137E−02 |
| A6 | −4.3591E−03 |
| A8 | −2.9782E−04 |
| A10 | 3.3395E−04 |
| A12 | 5.6412E−05 |

Optical path difference function (HD DVD: $0^{th}$ order DVD: $0^{th}$ order CD: $1^{st}$ order Manufacturing wavelength 785 nm)

| | |
|---|---|
| C2 | −1.2153E−01 |
| C4 | 4.3456E−02 |

TABLE 5-continued

| | |
|---|---|
| C6 | −2.1003E−02 |
| C8 | 8.2702E−03 |
| C10 | −1.6107E−03 |

3$^{rd}$ surface (0.60 mm < h)
Aspheric surface coefficient

| | |
|---|---|
| κ | −3.0933E+01 |
| A4 | 1.9137E−02 |
| A6 | −4.3591E−03 |
| A8 | −2.9782E−04 |
| A10 | 3.3395E−04 |
| A12 | 5.6412E−05 |

Optical path difference function (HD DVD: 0$^{th}$ order DVD: 0$^{th}$ order CD: 1$^{st}$ order Manufacturing wavelength 785 nm)

| | |
|---|---|
| C2 | −6.6094E−02 |
| C4 | 2.9813E−02 |
| C6 | 8.1836E−03 |
| C8 | −1.1065E−03 |
| C10 | −2.8721E−03 |

What is claimed is:

1. An objective optical element for use in an optical pickup apparatus which conducts reproducing and/or recording of the information by forming a converged spot on an information recording surface of a first optical information recording medium having a protective substrate thickness t1 with a first light flux of a wavelength λ1 emitted from a first light source, conducts reproducing and/or recording of the information by forming a converged spot on an information recording surface of a second optical information recording medium having a protective substrate thickness t2 (t1≦t2) with a second light flux of a wavelength λ2 (λ1<λ2) emitted from a second light source, and conducts reproducing and/or recording of the information by forming a converged spot on an information recording surface of a third optical information recording medium having a protective substrate thickness t3 (t2<t3) with a third light flux of a wavelength λ3 (λ2<λ3) emitted from a third light source, the objective optical element consisting of a single lens which is commonly used for the first to the third optical information recording media, which has two phase structures of a first phase structure and a second phase structure, and whose at least one surface is an aspheric surface, wherein when the third light flux is incident on at least one of the first phase structure and the second phase structure, the third light flux is separated into two diffracted light fluxes, and the objective optical element is configured to converge a diffracted light flux of the two diffracted light fluxes whose focal position is far from the objective optical element on the information recording surface of the third optical information recording medium, and the third light flux has a light utilizing efficiency less than 50%.

2. The objective optical element of claim 1, wherein the light utilizing efficiency of each of the first light flux and the second light flux is more than 75%.

3. The objective optical element of claim 1, wherein the first phase structure is a superimposed diffractive structure in which patterns whose sectional shape including the optical axis is a stair-shape, are concentric circularly arranged and for each number of a predetermined level surfaces, steps are shifted by the height for the number of steps corresponding to the number of level surfaces, and the superimposed diffractive structure has a wavelength selectivity which does not diffract the first light flux and the third light flux, but diffract the second light flux.

4. The objective optical element of claim 3, wherein an optical path difference added to the first light flux by the step difference for one of the superimposed diffractive structure is 2×λ1.

5. The objective optical element of claim 4, wherein the predetermined number of level surfaces is 5.

6. The objective optical element of claim 4, wherein the first phase structure is a saw-toothed diffractive structure, and the following expression is satisfied:

dor1>dor2≧dor3, where dor1 is an even number, and where dor1 represents a diffraction order having the maximum diffracted light ray amount among diffracted light rays generated when the first light flux is incident on the saw-toothed diffractive structure, dor2 represents a diffraction order having the maximum diffracted light ray amount among diffracted light rays generated when the second light flux is incident on the saw-toothed diffractive structure, and dor3 represents a diffraction order having the maximum diffracted light ray amount among diffracted light rays generated when the third light flux is incident on the saw-toothed diffractive structure, and wherein the objective optical element converges; the dor1$^{th}$-order diffracted light ray of the first light flux on the information recording surface of the first optical information recording medium; the dor2$^{th}$-order diffracted light ray of the second light flux on the information recording surface of the second optical information recording medium; and the dor3$^{th}$-order diffracted light ray of the third light flux on the information recording surface of the third optical information recording medium.

7. The objective optical element of claim 6, wherein the diffraction order dor1 is 2, the diffraction order dor2 is 1, and the diffraction order dor3 is 1.

8. The objective optical element of claim 1, wherein the second phase structure is a superimposed diffractive structure in which patterns whose sectional shape including the optical axis is a stair-shape, are concentric circularly arranged and for each number of a predetermined level surfaces, steps are shifted by the height for the number of steps corresponding to the number of level surfaces, and the superimposed diffractive structure has a wavelength selectivity which does not diffract the first light flux and the second light flux, but diffract the third light flux.

9. The objective optical element of claim 8, wherein an optical path difference added to the first light flux by a step difference for one of the superimposed diffractive structure is 5×λ1.

10. The objective optical element of claim 9, wherein the predetermined number of level surfaces is 2.

11. The objective optical element of claim 10, wherein the second phase structure is a saw-toothed diffractive structure, and the following expression is satisfied, dor1'>dor2'≧dor3', where dor1' is an odd number, and where dor1' represents the diffraction order having the maximum diffracted light ray amount among diffracted light rays generated when the first light flux is incident on the saw-toothed diffractive structure, dor2' represents a diffraction order having the maximum diffracted light ray amount among diffracted light rays generated when the second light flux is incident on the saw-toothed diffractive structure, and dor3' represents a diffraction order having the maximum diffracted light ray amount among diffracted light rays generated when the third light flux is incident on the saw-toothed diffractive structure, and wherein the objective optical element converges; the dor1'$^{th}$-order diffracted light ray of the first light flux on the information recording surface of the first optical information recording medium; the dor2'$^{th}$-order diffracted light ray of the second light flux on the information recording surface of the second optical information recording medium; and the dor3'$^{th}$-order diffracted light ray of the third light flux on the information recording surface of the third optical information recording medium.

12. The objective optical element of claim 11, wherein the diffraction order dor1' is 3, the diffraction order dor2' is 2, and the diffraction order dor3' is 2.

13. The objective optical element of claim 1, wherein the first phase structure is formed on an optical surface on the light source side, and the second phase structure is formed on the optical surface on an optical information recording medium side.

14. The objective optical element of claim 1, wherein when a designed magnification for the first wavelength is m1, a designed magnification for the second wavelength is m2, and a designed magnification for the third wavelength is m3, the following expression is satisfied m1=m2=0

−0.15≦m3≦0.

15. The objective optical element of claim 1, wherein the objective optical element is made of low melting point glass whose transition point Tg is less than 400° C.

16. The objective optical element of claim 1, wherein the objective optical element is made of a resin.

17. The objective optical element of claim 1, wherein the objective optical element is formed in such a manner that resin layer is pasted together to a surface of glass-made lens, and in the surface of the resin layer, the first phase structure or the second phase structure is formed.

18. The objective optical element of claim 16, wherein particles whose sign of the refractive index change rate following the temperature change is reverse to the resin, and whose diameter is less than 30 nm are dispersed in the resin.

* * * * *